United States Patent Office 2,773,756
Patented Dec. 11, 1956

2,773,756

PROCESSES FOR THE PRODUCTION OF CARBON MONOXIDE AND HYDROGEN FROM METHANE OR THE LIKE

Heinrich Merkel, Essen, Germany, assignor, by mesne assignments, to Koppers Company, Inc., Pittsburgh, Pa., a corporation of Delaware No Drawing. Application December 31, 1952, Serial No. 329,142

7 Claims. (Cl. 48—196)

This invention relates to a conversion of methane, gases containing methane, or gas mixtures containing similar hydrocarbons, into gases containing carbon monoxide and hydrogen, by means of oxygen or air of increased oxygen content, and more particularly to the conversion of such gases with iron catalysts.

It has been found that methane or gases containing methane can be converted into gases which contain carbon monoxide and hydrogen by first of all reacting the methane with air in the presence of a combustion catalyst with partial combustion of the methane, whereupon the resulting gas mixture is brought into contact with an iron catalyst in the presence of which the unconverted methane reacts with the reaction products $CO_2$ and $H_2O$ of the first reaction stage.

However, it has been discovered that difficulties arise with this method of operation if the oxygen content of the air is increased or if pure oxygen is used, as is necessary for example to produce reaction gases of low nitrogen content. If the methane gas is reacted with oxygen or air of increased oxygen content in the manner described, the iron catalyst is inactive or ineffective. It has been found that this inactivity or ineffectiveness of the iron catalyst is due to the composition of the combustion products when oxygen or oxygen-enriched air is used in the combustion step. When oxygen or oxygen-enriched air is used, the combustion products contain higher concentrations of steam and carbon dioxide than is the case when air of normal oxygen content is used for combustion. As a result of the increased concentration of steam and carbon dioxide in the combustion gases, the iron catalyst is oxidized and loses its activity or effectiveness. Attempts to prevent the reaction of the steam and the carbon dioxide with the iron catalyst by reducing the reaction temperature or reducing it to a harmless value had a negative result. It was found that even below 650° C. an oxidation of the iron catalyst takes place whilst at temperatures around 450° C. disadvantageous side reactions predominate.

According to the invention, the products of the combustion, prior to contact with the iron catalyst, are admixed with a sufficient amount of syntheses gas to produce a gaseous mixture in which the partial pressure of the steam and carbon dioxide are reduced to substantially the value which obtains when the combustion products are the result of combustion with air of normal oxygen content. By so reducing the partial pressures of the steam and carbon dioxide, operation of the process proceeds smoothly and the life of the iron catalyst even after continuous operation over prolonged periods using oxygen or oxygen-enriched air is practically the same as when air of normal oxygen content is used.

Before addition of the synthesis to the combustion products, any water or steam present therein may be separated in a suitable manner, for example, by impact separators or by condensation. In some cases it is preferable also to remove in a suitable manner from the reaction gas the carbon dioxide, for example by washing with water or alkali.

A further advantage of the process according to the invention consists in that in some cases there may be added to the methane gas before the said partial combustion with oxygen, a certain quantity of steam in order for example to control the explosion limit of the methane gas-oxygen mixture without impeding by this addition of steam the reaction on the iron catalyst.

*Example of operation*

In order hourly to convert 1 N m.³ of methane into cracking gas in accordance with the equation $$CH_4 + \tfrac{1}{2}O_2 = CO + 2H_2$$

there are arranged spaced from each other in a vertical reaction tube 540 cm.³ of nickel catalyst on a magnesite base and 2160 cm.³ of fused iron contact. The total catalyst volume of 2.7 litres is charged hourly with 1000 litres of methane and 620 litres of oxygen, corresponding to a volumetric speed of 600.

To begin the operation the zone of the nickel catalyst is first of all heated in an oxygen-free atmosphere to 650–700° C. The $CH_4$-$O_2$ mixture is then slowly turned on whereafter the combustion of the methane takes place with a light red glow. To the gas there is then added an adjustable quantity of synthesis gas from which steam and if required carbon dioxide have been separated, and the temperature of the iron catalyst is increased to 740–760° C. For the working temperatures stated a space speed of the returned synthesis gas of 1250 volumes of gas per volume of catalyst per hour is suitable in order to protect the iron catalyst from oxidation. With a charge of 2160 cm.³ of fused iron contact, 2700 litres of synthesis gas were circulated per hour. The total charge to the iron catalyst amounted with the stated operating conditions to about 2000 litres per litre of catalyst per hour.

From 1000 litres of methane and 620 litres of oxygen 2290 litres of synthesis gas are formed showing the following composition:

$CO_2 = 6.9\%$
$CO = 28.4\%$
$H_2 = 55.2\%$
$CH_4 = 8.6\%$
$N_2 = 0.9\%$

Rust formation and oxidation are not perceptible.

I claim:

1. A catalytic process for the production of synthesis gas containing carbon monoxide and hydrogen of high purity and of a relatively low nitrogen content without substantially impairing the activity of an iron conversion catalyst employed in the process, which comprises subjecting to partial combustion a mixture of a normally gaseous hydrocarbon and a gas selected from the group consisting of oxygen and oxygen-enriched air, the oxygen being present in an amount insufficient to react completely with said hydrocarbon, to thereby form a gaseous product of partial combustion comprising carbon monoxide, carbon dioxide, steam, and unreacted normaly gaseous hydrocarbon, admixing said gaseous product with an amount of synthesis gas containing carbon monoxide and hydrogen sufficient to produce a gaseous mixture in which the partial pressure of the steam and the partial pressure of the carbon dioxide are reduced to substantially the value which would be obtained if the gaseous product of partial combustion was produced as the result of subjecting a partial combustion a mixture of said normally gaseous hydrocarbon and air of normal oxygen content, and thereafter passing the thus-produced gaseous mixture into contact with the iron catalyst to thereby convert said gaseous product of partial combustion to synthesis gas consisting primarily of carbon monoxide and hydrogen.

2. The process of claim 1 in which steam is removed from the syntheses gas prior to its admixture with the combustion product.

3. The process of claim 2 in which the normally gaseous hydrocarbon is methane.

4. The process of claim 3 in which the volumetric speed of the mixture of methane and a gas selected from the group consisting of oxygen and oxygen-enriched air is 600.

5. The process of claim 1 in which the combustion takes place in the presence of a combustion catalyst.

6. The process of claim 5 in which the combustion catalyst comprises nickel.

7. The process of claim 6 in which the temperature of the combustion catalyst is 650–700° C. and the temperature of the iron catalyst is 740–760° C.

References Cited in the file of this patent

UNITED STATES PATENTS

| | | |
|---|---|---|
| 1,711,036 | Beekly | Apr. 30, 1929 |
| 2,529,630 | Reichl | Nov. 14, 1950 |
| 2,552,737 | Rees | May 12, 1951 |
| 2,558,760 | Keith | July 3, 1951 |
| 2,566,936 | Garrison | Sept. 4, 1951 |
| 2,605,174 | Krejci | July 29, 1952 |
| 2,631,086 | Noak et al. | Mar. 20, 1953 |
| 2,681,272 | Jewell | June 15, 1954 |
| 2,683,121 | Vincent | July 6, 1954 |
| 2,683,152 | Dickinson | July 6, 1954 |

UNITED STATES PATENT OFFICE

CERTIFICATE OF CORRECTION

Patent No. 2,773,756 December 11, 1956

Heinrich Merkel

It is hereby certified that error appears in the printed specification of the above numbered patent requiring correction and that the said Letters Patent should read as corrected below.

Column 1, line 15, for "to a" read --to the--; column 2, line 68, for "a partial" read --to partial--.

Signed and sealed this 30th day of April 1957.

(SEAL)
Attest:
KARL H. AXLINE
 Attesting Officer

ROBERT C. WATSON
Commissioner of Patents